United States Patent Office 3,579,446
Patented May 18, 1971

3,579,446
FIRE-EXTINGUISHING FOAM COMPOSITION INCLUDING A BASIC, NITROGENOUS COMPOUND
Hermann Kroke, Erkrath-Unterbach, and Kurt Raffalsky, Urach, Wurttemberg, Germany, assignors to Minimax Aktiengesellschaft, Urach, Wurttemberg, and Henkel & Cie. G.m.b.H., Dusseldorf, Germany
No Drawing. Filed Mar. 24, 1969, Ser. No. 809,945
Claims priority, application Austria, Apr. 29, 1968, A 4,153/68
Int. Cl. A62d 1/00
U.S. Cl. 252—3
11 Claims

ABSTRACT OF THE DISCLOSURE

In a foaming composition useful as a fire extinguisher composed of
(1) A foaming agent such as substituted or unsubstituted alkyl or alkyl-ether sulfate;
(2) A stabilizing additive to improve the water-retaining capacity of the foam, such as higher aliphatic alcohol or ether containing from 8 to 25 carbon atoms, or a higher aliphatic alcohol containing a few alkylene oxide molecules;
(3) Optionally, a compensating agent, which aids in production of foams with reduced weight and of lower discharge velocities, such as monovalent polyether alcohols;
the improvement comprising the use of water-soluble, basic, organic or inorganic nitrogenous compound which neutralizes corrosive effects of halides in the combustion gases.

PRIOR ART

The use of extinguishing foams of various kinds for fighting fires is known. The production of the extinguishing foams is effected from an aqueous solution of foam-producing concentrates by expansion with gases, preferably air. The usual foam-producing concentrates contain a foam agent and a stabilizing additive. The following foam agents are known in the prior art: protein-hydrolysates, alkyl-, aryl-, alkyl-aryl sulfonates, sulfuric esters of higher alcohols with straight or branched chains, sulfates of fatty alkanol amides, fatty monoglycerides or methyl taurine in the form of ammonium- or amine-salts. Of particular importance as foaming agents are the salts of alkyl ether sulfates of the general formula $$[R-(OR')_n-SO_4]^-X^+$$

where R denotes an aliphatic radical with 10–20 carbon atoms; R' is a bivalent aliphatic radical with 2–3 carbon atoms; $n$ is a number from 1 to 10; and X is a cation such as aluminum, potassium, sodium, calcium, magnesium, a monoethanol amine, diethanol amine or triethanol amine radical.

As stabilizing additives, which improve the water-retaining power of the foam, the following can be used: higher aliphatic fatty alcohols and amides with 8 to 25 carbon atoms, as well as addition products of alkylene oxide on these higher fatty alcohols to provide said alcohols with few alkylene oxide molecules, or copolymers of vinyl ethers and maleic anhydride. Among these, the higher alcohols, such as lauryl or myristic alcohols, for example, have proved particularly suitable.

Furthermore, the so-called compensating agents have been added to the foam-producing concentrates for the production of foams which are lower in weight and have lower discharge velocities and therefore can be delivered over greater distances to the fire site. These compensating agents represent monovalent polyether alcohols of the general formula $$[R_1-(OR')_m-OH]$$

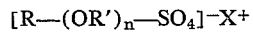

where $R_1$ denotes an aliphatic radical with 1–4 carbon atoms; R', a bivalent aliphatic radical with 2–3 carbon atoms; and $m$, a number from 1 to 3. Compounds of this type are, for example, diethylene glycol monomethyl ether, diethylene glycol monoethyl ether, diethylene glycol monobutyl ether, dipropylene glycol monoethyl ether, 1-butoxyethoxy-2-propanol, ethylene glycol monobutyl ether, triethylene glycol monoethyl ether, and triethylene glycol monobutyl ether.

Conventional foam-producing concentrates consist of aqueous solutions which contain about 20–60% by weight of a foam agent, 1–10% by weight of a stabilizing additive, and if necessary, 10–70% by weight of a compensating agent.

Foam-producing concentrates described above have proved to be successful fire extinguishers in the past. But recently, it was found that, due to the great advance of plastics in all walks of life, these foam fire extinguishers do not have the necessary effect in fires where certain types of plastics are involved. This is particularly true of fires where plastics of higher halogen content are involved. Though the fire could be rapidly extinguished by means of the known extinguishing foams, the extent of damages due to secondary effects is greater than that of the thermal fire damage. The reason for the unusually high secondary fire damage is due to hydrogen halides, and hydrogen chloride in particular, which appear as decomposition gases in combustion of halogenous plastics. The hydrogen chloride is swirled with the other combustion gases and spread over the entire burning object, and possibly over objects in the vicinity not directly affected by the fire. Since there is plenty of water and water vapor at these fires, corrosion of maximum degree and extent commences. Not only the visible corrosion phenomena, but particularly the concealed harmful effects are of great importance. Thus, hydrogen chloride in the combustion gases is absorbed by the brickwork and hygroscopic calcium chloride is formed with the existing lime. Calcium chloride absorbs additional moisture, in the course of time, into the brickwork which travels into lower layers where it causes corrosion of iron and steel reinforcements. In a period of time, stability of the entire building can be jeopardized.

OBJECTS OF THE INVENTION

It is an object of the present invention to provide a fire-extinguishing foam composition capable of preventing damage caused by deleterious components produced by combustion of objects containing halogenated plastics.

Another object of the invention is to prepare a fire-extinguishing foam composition capable of neutralizing the corrosion effect of halides in the combustion gases composed of a foaming agent; a stabilizing additive; an optional compensating agent; and a water-soluble, basic, organic or inorganic nitrogenous compound.

A further object of the invention is the production of a fire-extinguishing foam composition capable of minimizing fire damages due to secondary effects.

Still another object of the invention is the preparation of a novel non-corrosive fire-extinguishing foam composition which can be stored and transported in metal containers.

THE INVENTION

The problem of eliminating corrosive components from combustion gases has been solved by a foam fire-extinguishing composition based on salts of unsubstituted or substituted alkyl sulfates and alkyl-ether sulfates, as foam agents; stabilizing additives; compensating agents, if necessary; and a water-soluble, basic, nitrogenous, organic or inorganic compound or a mixture of such compounds.

The following are suitable foam agents: all unsubstituted or substituted alkyl-sulfates and alkyl-ether sulfates which have been used for this purpose in the past, such as sulfuric esters of higher alcohols with straight or branched chains; sulfates or fatty acid alkanol amides; fatty acid monoglycerides or methyl taurine in the form of ammonium and/or amine salts; and salts of alkyl-ether sulfates of the general formula

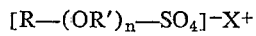

$$[R-(OR')_n-SO_4]^-X^+$$

where R denotes an aliphatic radical with 10–20 carbon atoms; R′, a bivalent aliphatic radical with 2 or 3 carbon atoms; $n$, a whole number from 1 to 10; and X, a cation such as ammonium, potassium, sodium, calcium, magnesium, a monoethanol amine, diethanol amine or triethanol amine radical. Of particular importance are the last-mentioned salts of alkyl-ether sulfates and the amine salts and alkanol amine salts of the sulfuric esters of higher fatty alcohols, an example of which is triethanolamine lauryl sulfate.

With respect to stabilizing additives, higher aliphatic alcohols and amides, with 8–25 carbon atoms as well as addition products of alkylene oxide with these higher fatty alcohols to provide said alcohol with few alkylene oxide molecules. Particularly suitable are the higher fatty alcohols, and among these is lauryl alcohol.

If necessary, compensating agents can be used. These agents are defined as monovalent polyether alcohols of the general formula

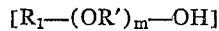

$$[R_1-(OR')_m-OH]$$

where $R_1$ denotes an aliphatic radical with 1–4 carbon atoms; R′, a bivalent aliphatic radical with 2–3 carbon atoms; and $m$ is a whole number between 1 and 3. Of particular importance in this group of compounds is diethylene-glycol monobutyl ether.

The foam fire-extinguishing composition also contains 20–60% by weight based on the total composition, a compound or a mixture of such compounds selected from (1) Water-soluble, basic nitrogenous inorganic compounds, and
(2) Water-soluble, basic, nitrogenous organic compounds.

The first group includes water-soluble, basic, nitrogenous inorganic compounds and their basic salts of inorganic acids such as ammonia, hydrazine, hydrazine hydrate, hydroxyl amine, ammonium carbonate, ammonium bicarbonate, commercial ammonium carbonate.

The second group includes water-soluble, basic, nitrogenous organic compounds selected from the group of lower monoalkylamines such as methylamine, ethylamine, propylamine, butylamine; lower dialkylamines such as dimethylamine; lower trialkylamines such as trimethylamine; lower monoalkyl hydrazines; lower monoalkanol amines; lower dialkanol amines; lower trialkanol amines; cycloaliphatic amines such as morpholine; cycloaromatic amines such as pyridine.

Best results were obtained with lower aliphatic alkanol amines, such as monoethanolamine. Like ammonia and the other lower aliphatic amines, it has a strong attraction for hydrogen chloride and good water-solubility. In addition, it permits preparation of products having good flow properties without the addition of compensating agents. Monoethanolamine seems to perform two functions, namely, the elimination of the acidic combustion gases and the function of the compensating agents.

Foam-producing concentrates of the presently known composition have generally a more or less corroding effect on metal containers, so that only plastic containers can be used for shipping and storing these products. The concentrates containing additions of water-soluble, basic, nitrogenous compounds are not corrosive, which means that they can be stored safely in metal containers, such as iron or steel containers.

The following examples are illustrative of the herein described invention. It is to be understood that these examples are not intended to limit the scope of the invention.

EXAMPLE I

The foam fire-extinguishing composition used in the following tests had the following ingredients:

40% by weight triethanolaminelauryl sulfate, 50% aqueous solution
1.5% by weight lauryl alcohol
55% by weight monoethanolamine
3.5% by weight water The viscosity of the composition was 546 cp. at 20° C., and the absorption of hydrogen chloride was 290 g./kg. of the composition. In testing the behavior at low temperature, turbidity was detected at +5° C., and the solidification point was at about −15° C.

With the foam fire-extinguishing composition, the foam produced therefrom must have a particularly good water-retaining power in addition to a sufficient stability, since the extinguishing effect depends on the water content of the foam. This water-retaining power can be measured on the basis of DIN 53902 by simply foaming in a graduated cylinder a 200 g. sample of 1%, 2%, and 3% aqueous solution of the composition by means of a screen plate (42 beats per 30 seconds) and measuring the time until half of the solution (100 g.) has exuded from the foam (half value period).

The following values were obtained with the prepared composition:

| Solution concentration, percent: | Initial foam volume after mechanized foaming, cc. |
|---|---|
| 1 | 500 |
| 2 | 900 |
| 3 | 1000 |

| Solution concentration, percent: | Half-value periods of the foams produced, minutes |
|---|---|
| 1 | 2.5 |
| 2 | 13.75–16 |
| 3 | 22.5–21.76 |

In order to test the absorption of acidic combustion cases, 10 kg. of polyvinyl chloride were set in a fire box measuring 2.50 x 1.50 x 1.80 m. After considerable evolution of combustion gases, the fire was extinguished with a foam composition prepared in accordance with the procedure of the present example and an identical composition wherein monoethanolamine was replaced with an equal amount of diethyleneglycol monobutyl ether, as a compensating agent. The pH-values of the water issuing from the extinguishing foam were then measured to determine effectiveness of the compositions with respect to neutralization of acidic components. It was found that the pH-value of the issuing water from the composition of the invention was 9.5 to 10.5, while the outflowing water of the foam composition without monoethanolamine has a pH-value of about 2–3. It is apparent that the foam composition prepared in accordance with the invention could have absorbed additional amounts of acidic gases.

Storage tests at 50° C. showed that the foam composition did not deteriorate at this temperature after 3 days and at room-temperature after 3 months. The behavior of the products of the invention at low temperatures was found to be satisfactory. It is possible to further improve the behavior of these products at low temperatures by replacing a part of the monoethanolamine by diethyleneglycol monobutyl ether.

EXAMPLE II

This example was based on a foam composition containing basic nitrogenous substance and a compensating agent.

40% by weight triethanolaminelauryl sulfate, aqueous solution 50% ig.
1.5% by weight lauryl alcohol
25% by weight monoethanolamine
30% by weight diethyleneglycol monobutyl ether
3.5% by weight water.

The viscosity of the composition was 315 cp. at 20° C. and the absorption of hydrogen chloride was 140 g./kg. of the composition. In testing the low-temperature behavior, turbidity was detected at −18° C. and the solidifying point was at about −19° C.

| Solution concentration, percent: | Initial foam volume after mechanized foaming, cc. |
|---|---|
| 1 | 550 |
| 2 | 900 |
| 3 | 1000 |

| Solution concentration, percent: | Half-value periods of the foams produced, min. |
|---|---|
| 1 | 2.5 |
| 2 | 18–17.5 |
| 3 | 29.5 |

The pH-value of the outflowing water in the polyvinyl chloride fire-extinguishing test corresponding to the procedure of Example I, was 9.0–9.5 with composition prepared in this example. The storage test at 50° C. showed no deterioration of the foam composition after 3 days and at room-temperature after 3 months.

EXAMPLE III

A foam-producing composition of the following composition was used:

1.5% by weight lauryl alcohol
25% by weight triethanolamine lauryl sulfate, 80% aqueous solution
55% by weight diethylene glycol monobutyl ether
18.5% by weight 25% aqueous ammonia solution.

The viscosity of the concentrates was 16 cp. at 20° C. and the absorption of hydrogen chloride was 100 g./kg. of composition. In testing the low-temperature behavior, turbidity was detected at 5° C. and the solidifying point was at about −5° C.

The initial foam volume, after mechanized foaming method, was 1000 cc. The half-value period of the foam produced was 29 minutes.

The storage test at 50° C. showed no deterioration of the foaming composition. As is evident from the foregoing laboratory test data, the use of ammonia in combination with a compensating agent, yielded a foam composition which is in no way inferior to the usual foam compositions without the basic compounds.

EXAMPLE IV

This example was based on a foam composition containing a basic, nitrogenous substance and a compensating agent.

43.1% by weight of sodium salt of lauryl-myristyldiglycol ether sulfate, 28% active substance
1.9% by weight lauryl alcohol
25% by weight monoethanolamine
30% by weight diethylene glycol monobutyl ether.

The viscosity of the composition at 20° C. was 21 cp. and the absorption of hydrogen chloride was 140 g./kg. of the concentrate. In testing the behavior at low temperature, turbidity was detected at about 0° C. and the solidification point was about −10° C.

The initial foam volume after mechanized foaming was 950 cc., and the half-value period of the foam produced was 25 minutes. The storage test at 50° C. showed no deterioration of the foam composition.

In addition to the light foam compositions based on salts of sulfuric esters of higher fatty alcohols and their glycol ethers, which were tested in the preceding examples, heavy foam compositions based on proteinated substances were prepared with monoethanol amine. Stable alkaline products were also obtained of slightly different foaming and other properties, i.e., characteristic of the foam compositions of this type.

Various modifications of the foam composition described herein can be made without departing from the spirit or scope thereof.

We claim:

1. In a fire-extinguishing foam composition which includes a foaming agent of substituted or unsubstituted alkyl sulfate or alkyl-ether sulfate, and a stabilizing additive to improve water-retaining capacity of said foam, the improvement comprising a content of 20–60% by weight of said composition of a compound selected from the group consisting of water soluble, basic nitrogenous inorganic compounds and their basic salts of inorganic acids; and water-soluble, basic, nitrogenous organic compounds selected from the group consisting of lower monoalkylamines, lower dialkylamines, lower trialkylamines, lower monoalkyl hydrazines, lower monoalkanol amines, lower dialkanol amines, lower trialkanol amines, cycloaliphatic amines, and cycloaromatic amines.

2. Composition of claim 1 including a compensating agent for the purpose of reducing weight and reducing discharge velocity of said foam, said compensating agent being a monovalent polyether alcohol.

3. Composition of claim 1, wherein said basic compound is selected from the group of lower aliphatic alkanol amines.

4. Composition of claim 3, wherein said amine is monoethanolamine.

5. Composition of claim 1, wherein said foaming agent is a salt of alkyl-ether sulfate having the following general formula:

$$[R\text{—}(OR')_n\text{—}SO_4]^-X^+$$

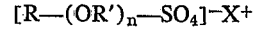

where R denotes an aliphatic radical with 10–20 carbon atoms, R′ is a bivalent aliphatic radical having from 2 to 3 carbon atoms, $n$ is a number from 1 to 10, and X is a cation selected from the group consisting of ammonium, sodium, calcium, magnesium, monomethylamine-, diethylamine-, and triethylamine-radicals.

6. Composition of claim 1, wherein said foaming agent is selected from the group consisting of amine and alkanol amine salts of sulfuric esters of higher fatty alcohols, and mixtures thereof.

7. Composition of claim 5, wherein said foaming agent is triethanolamine lauryl sulfate.

8. Composition of claim 7, wherein said stabilizing additive is selected from the group consisting of higher aliphatic alcohols having from 8 to 25 carbon atoms.

9. A fire-extinguishing foam composition effective in neutralizing acidic components in combusion gases comprising
 (a) 2–60% by weight on basis of said composition in absence of the ingredient, of a foaming agent selected from the group consisting of substituted and unsubstituted alkyl sulfates and alkyl-ether sulfates;
 (b) 1–10% by weight on basis of said composition in absence of the ingredient, of a stabilizing additive to improve water-retaining capacity of said foam, selected from the group consisting of higher aliphatic alcohols and amides having from 8 to 25 carbon atoms, addition products of alkylene oxide with the aliphatic alcohols, and copolymers of vinyl ethers and maleic anhydride;

(c) Optionally, 10–70% by weight on basis of said composition in absence of the ingredient, of a compensating agent for reducing weight and discharge velocity of said foam, selected from the group consisting of monovalent polyether alcohols; and (d) 20–60% by weight based on total composition, of a basic ingredient selected from the group consisting of
  (a) water-soluble, basic nitrogenous inorganic compounds and their basic salts of inorganic acids; and
  (b) water-soluble, basic, nitrogenous organic compounds selected from the group consisting of lower monoalkylamines, lower dialkylamines, lower trialkylamines, lower alkyl hydrazines, lower monoalkanol amines, lower dialkanol amines, lower trialkanol amines, cycloaliphatic amines, and cycloaromatic amines; and
  (c) mixtures of (a) and (b).

10. Composition of claim 9, wherein said foaming agent is selected from the group consisting of salts having the general formula $$[R-(OR')_n-SO_4]^-X^+$$

where R designates an aliphatic radical of 10–20 carbon atoms; R′ is a bivalent aliphatic radical of 2 to 3 carbon atoms; $n$ is a whole number from 1 to 10; and X is a cation selected from the group consisting of ammonium, potassium, sodium, calcium, magnesium, a monoethanol amine, a diethanol amine, and a triethanol amine.

11. Composition of claim 10, wherein said stabilizing additive is selected from the group consisting of higher aliphatic alcohols and amides with 8 to 25 carbon atoms and addition products of alkylene oxide and the aliphatic alcohols; said compensating agent is selected from the group consisting of monovalent polyether alcohols having the general formula $$[R_1-(OR')_m-OH$$

where $R_1$ denotes an aliphatic radical of 1 to 4 carbon atoms, R′ is a bivalent radical of 2 to 3 carbon atoms, $m$ is a whole number between 1 and 3; and said basic ingredient is selected from the group consisting of lower alkanolamines.

References Cited

UNITED STATES PATENTS 3,422,011  1/1969  Jackovitz et al. _____ 252—3

FOREIGN PATENTS 1,052,788  12/1966  Great Britain _____ 252—3

JOHN T. GOODKASIAN, Primary Examiner

D. J. FRITSCH, Assistant Examiner

U.S. Cl. X.R.

252—8.05, 307